(12) United States Patent
Uchida (10) Patent No.: US 7,739,593 B2
(45) Date of Patent: Jun. 15, 2010

(54) INFORMATION PROCESSING APPARATUS AND METHOD FOR HANDLING FORMS

(75) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1187 days.

(21) Appl. No.: 11/303,098

(22) Filed: Dec. 16, 2005

(65) Prior Publication Data

US 2006/0136820 A1 Jun. 22, 2006

(30) Foreign Application Priority Data

Dec. 17, 2004 (JP) ............................. 2004-366004
Dec. 2, 2005 (JP) ............................. 2005-349489

(51) Int. Cl.
*G06F 17/00* (2006.01)

(52) U.S. Cl. ...................... 715/255; 715/209; 715/247; 358/1.16

(58) Field of Classification Search .................. 707/1; 715/251, 246–247; 358/1.1

See application file for complete search history.

(56) References Cited

U.S. PATENT DOCUMENTS

| 4,751,740 | A | * | 6/1988 | Wright | 382/180 |
|---|---|---|---|---|---|
| 5,566,068 | A | * | 10/1996 | Comer et al. | 707/1 |
| 5,642,521 | A | * | 6/1997 | Kiuchi et al. | 715/212 |
| 6,101,513 | A | * | 8/2000 | Shakib et al. | 715/234 |
| 6,128,633 | A | * | 10/2000 | Michelman et al. | 715/210 |
| 6,487,567 | B1 | * | 11/2002 | Michelman et al. | 715/210 |
| 6,626,959 | B1 | * | 9/2003 | Moise et al. | 715/210 |
| 6,748,123 | B1 | * | 6/2004 | Zlotnick et al. | 382/311 |
| 6,783,289 | B2 | * | 8/2004 | Tagawa | 400/61 |
| 7,227,558 | B1 | * | 6/2007 | Arata | 345/676 |
| 2003/0056177 | A1 | * | 3/2003 | Nara et al. | 715/525 |
| 2003/0165129 | A1 | * | 9/2003 | Sharma et al. | 370/338 |
| 2003/0182629 | A1 | * | 9/2003 | Okamura | 715/525 |
| 2004/0049735 | A1 | * | 3/2004 | Tsykora | 715/513 |
| 2005/0094207 | A1 | * | 5/2005 | Lo et al. | 358/1.18 |
| 2006/0031764 | A1 | * | 2/2006 | Keyser et al. | 715/525 |
| 2006/0150093 | A1 | * | 7/2006 | Chen | 715/518 |
| 2007/0041041 | A1 | * | 2/2007 | Engbrocks et al. | 358/1.15 |

FOREIGN PATENT DOCUMENTS

| JP | 7-175870 A | 7/1995 |
|---|---|---|
| JP | 2000-222497 A | 8/2000 |

* cited by examiner

*Primary Examiner*—Doug Hutton
*Assistant Examiner*—Quoc A Tran
(74) *Attorney, Agent, or Firm*—Canon U.S.A., Inc. I.P. Division (57) ABSTRACT

An information processing method and apparatus are provided which are capable of processing form data in which fields are defined and each of the fields contains record data. The method includes specifying fields in which at least one break is set from the field being contained in form data, in a case where print and break changing instruction is input. The method further includes obtaining a change instruction from an operator for changing break settings for at least one of the fields specified and inserting a break instruction at a place where a data break occurs in the field for which the break setting is set.

10 Claims, 13 Drawing Sheets

LIST OF NAMES

| DEPARTMENT | SECTION | NAME |
|---|---|---|
| ×× | ×× | ×× |

[TABLE DATA SECTION]

BUSINESS DEPARTMENT, FIRST SECTION, Taro SUZUKI
BUSINESS DEPARTMENT, FIRST SECTION, Jiro SATO
BUSINESS DEPARTMENT, SECOND SECTION, Saburo WATANABE
ACCOUNTING DEPARTMENT, FIRST SECTION, Ichiro ITO
ACCOUNTING DEPARTMENT, SECOND SECTION, Hanako TANAKA

| INVOICE | | |
|---|---|---|
| INVOICE DATE | PRODUCT NAME | MONEY (YEN) |
| 9/1 | AA | 2000 |
| 9/1 | BB | 1000 |
| 9/1 | CC | 1500 |
| 9/1 | DD | 1000 |
| 9/30 | AA | 2000 |
| 9/30 | BB | 2500 |

FIG. 11B

| INVOICE | | | |
|---|---|---|---|
| INVOICE DATE | PRODUCT NAME | MONEY (YEN) | INVOICE DATE |
| 9/1 | AA | 2000 | 9/1 |
|  | BB | 1000 | 9/1 |
|  | CC | 1500 | 9/1 |
|  | DD | 1000 | 9/1 |
| 9/30 | AA | 2000 | 9/30 |
|  | BB | 2500 | 9/30 |

FIG. 14

INFORMATION PROCESSING APPARATUS AND METHOD FOR HANDLING FORMS

BACKGROUND OF THE INVENTION

1. Field of the Invention

The present invention relates to a printing system that uses, for example, forms.

2. Description of the Related Art

There is a known system in which form data indicating a form part is created in advance, and data of numerical values and character strings are overlaid at predetermined places of the form data and are printed or displayed. Furthermore, there is a known technology for setting a break key in the middle of a field (Japanese Patent Laid-Open No. 2000-222497).

There is another known technology in which, when a desired column of records is specified and a change of data (a break of continuous records) occurs in the records of the specified column, a break such as a line break is inserted, and when a change of data occurs in the records of a column that is not specified, a break is not inserted (Japanese Patent Laid-Open No. H07-175870).

It is assumed in this embodiment that, when record data corresponding to a field that is stored and arranged as AAAABBBBCCCC in a database changes, at the position of each "/" of AAAA/BBBB/CCCC, a change of record data (a break of record data) occurs.

However, in the related art, the setting of the break items is fixed for each form. For this reason, as a means for switching between inserting a page break and not inserting a page break and for displaying or printing it, it is necessary to create a duplicate form in which only break settings are different. For example, when it is desired to create a list of names in department units and in section units, it is necessary to create a form in which a break is set to "section" and a form in which a break is set to "department", and this is inefficient. Furthermore, it is necessary for a user to consciously specify a form, and the user becomes burdened.

Alternatively, as another means, there is a known technique for extracting only the data to be displayed or printed without beginning a new page. However, this takes time and effort of changing extraction conditions again each time a display or a printing is performed.

Another disadvantage is that, when a printing is performed, a field in which a break is set cannot be changed dynamically and flexibly. Another problem is that, when a printing is performed, jobs are made separate, and a job may be interrupted by another job. Still yet another disadvantage is that, when a plurality of breaks are set, a break setting competition occurs between a high-order break (for example, a department break) and a low-order break (for example, a section break).

SUMMARY OF THE INVENTION

The present invention overcomes the aforementioned disadvantages.

One feature is that duplicate forms in which break settings are different need not to be created and efficient management of forms is made possible.

The present invention provides an information processing method capable of processing form data in which fields are defined and each of the fields is a field with a plurality of record data, the information processing method including the steps of specifying fields in which at least one break is set, the field being contained in form data, in case where print instruction is input and break changing instruction is input, obtaining a change instruction from an operator for changing break setting for at least one of the fields specified in the specifying step, and inserting a break instruction at a place where a data break occurs in the field for which the break setting is set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

DESCRIPTION OF THE EMBODIMENTS

Various embodiments, features and aspects of the present invention will now be described in detail with reference to the accompanying drawings.

First Exemplary Embodiment

Figure 1:
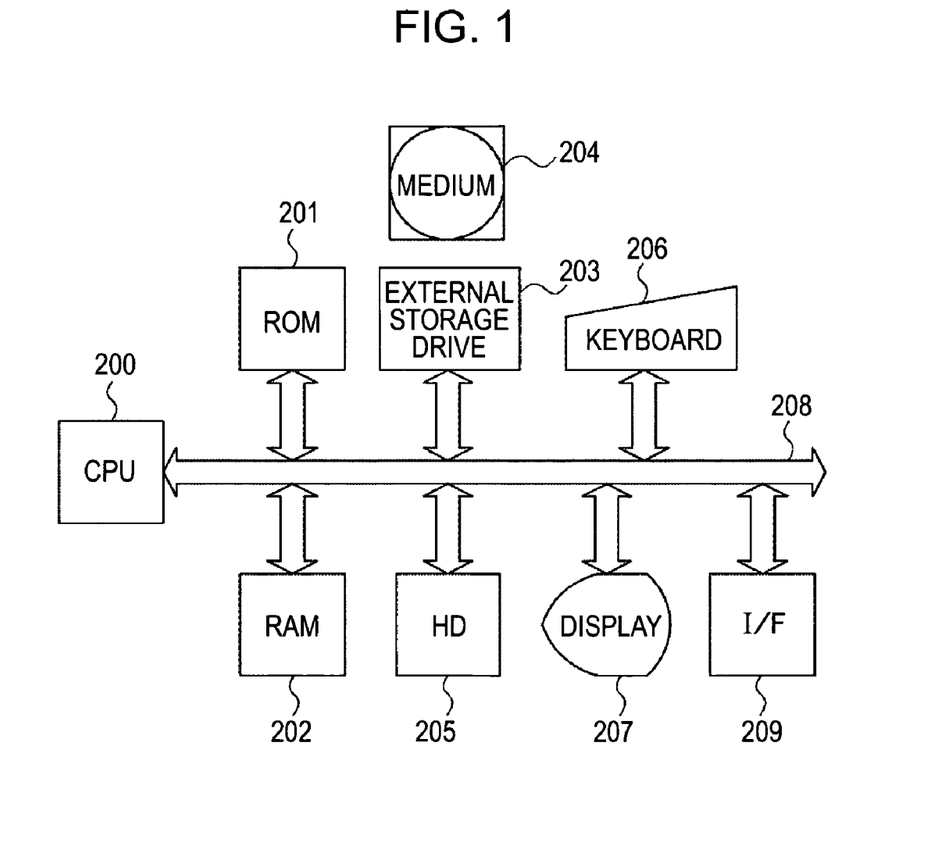
FIG. 1 is a block diagram showing an overall exemplary configuration of a computer that operates in this embodiment.

FIG. 1 is a block diagram showing an overall exemplary configuration of a computer that operates according to the present invention. Reference numeral 202 denotes a RAM that functions as a main memory, a work area, etc., for the CPU 200. The CPU 200 performs control so that an application program, a printer driver program, an OS, a network printer control program, etc., which are stored in an HD (hard disk) 205 or the like, are executed, and information, files, etc., which are necessary for executing a program, are temporarily stored in the RAM 202. In a ROM 201, programs such as a basic I/O program, and various kinds of data such as font data used for document processing and data for templates, are stored.

Figure 3:
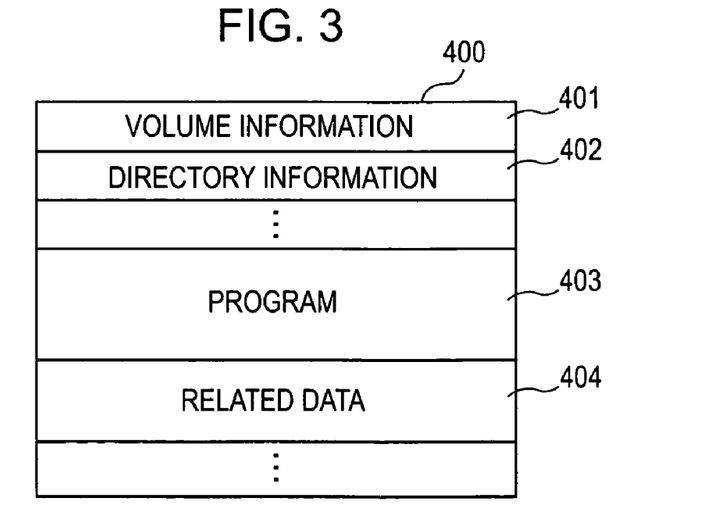
FIG. 3 shows an exemplary memory map indicating data inside an FD in FIG. 1.

Reference numeral 203 denotes an external storage drive that can load a program, etc., stored on a medium 204 into a computer system. Reference numeral 204 denotes a medium on which programs and related data described in this embodiment are stored. The structure of the stored content thereof is shown in FIG. 3 which is discussed with greater detail later in the specification. As mentioned, reference numeral 205 denotes the HD in which application programs, printer driver programs, the OS, control programs, and related programs are stored. Reference numeral 206 denotes a keyboard that is used for a user to instruct the input of a device control command, etc., to a client computer. Reference numeral 207 denotes a display for displaying a command input from the keyboard 206, the status of a printer, etc. Reference numeral 208 denotes a system bus that centrally controls the flow of data within the client computer. Reference numeral 209 denotes a network interface (hereinafter, referred to as "I/F"), which is a communication interface for connection with a network, such as a local area network (LAN), a wide area network (WAN), the Internet or the like.

Figure 2:
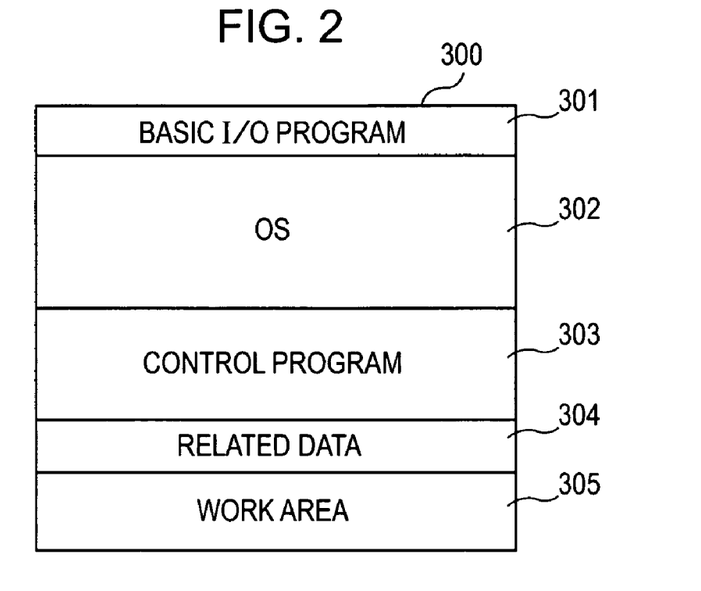
FIG. 2 shows an example of a memory map in which a program is loaded into a RAM in FIG. 1.

FIG. 2 shows an exemplary memory map 300 in a state in which a program according to the present invention is loaded into the RAM 202 and is executable. Reference numeral 301 denotes a basic I/O program, which is an area where a program having an IPL (initial program loading) function is placed, etc., by which the OS is read from the HD 205 into the RAM 202 and the OS starts operating when the power supply of the control device is switched on. Reference numeral 302 denotes an OS. A control program is loaded into an area 303, and related data is loaded into an area 304. A work area for the CPU 200 to execute the program is allocated in an area 305.

In this embodiment, an example is described in which a program and related data are directly loaded from the medium 204 into the RAM 202 and the program is executed. In addition, each time the program according to the present invention is to be run from the medium 204, the program may be loaded from the HD 205 to the RAM 202. Furthermore, media for recording programs according to the present invention may be an FD, a CD-ROM, a DVD, and an IC memory card, etc. In addition, programs according to the present invention can be recorded in the ROM 201 in such a manner that this forms a part of the memory map, and it is directly executed by the CPU 200.

In FIG. 3, reference numeral 400 denotes data content stored on the medium 204 or the HD 205, and it is loaded into the RAM 202 and is executed by the CPU 200. Reference numeral 401 denotes volume information indicating the information of data. Reference numeral 402 denotes directory information. Reference numeral 403 denotes a program described in this embodiment. Reference numeral 404 denotes related data thereof. The program 403 is programcoded on the basis of the flowchart of this program shown in FIG. 4 to FIGS. 12A-B.

For example, when data is to be overlaid in a form having a figure of a table format, such a table is formed in such a way that a field column composed of, for example, items such as departments, sections, and names, is displayed on the first row, and a plurality of data sequences composed of data corresponding to each field are arranged below the field column. In such table, when it is desired to perform processing of some kind of totaling-up, the setting of items is performed. For example, when it is desired to create a list of names for each department, as an item for defining the processing range (this is also called a "break item"), a "department" is set. Then, data sequences in which the "department" is the same are extracted. Then, usually, at this position, a page break is set to become a delimiter for printing. As a result, a list of names in which personnel is divided for each "department" can be displayed or printed as separate pages.

The term "break" in this embodiment refers to a process itself for inserting a line break or a page break in a field containing a plurality of record data when the unit of the value recorded in the record is switched. For example, in a plurality of field columns, when a particular field is set as a key, the field is searched for vertically and when a substantially different value (a null can be set so as to be excluded) is recognized, a line break key or a page break key can be inserted as a break key immediately before the record in which the different value is placed.

Figure 4:
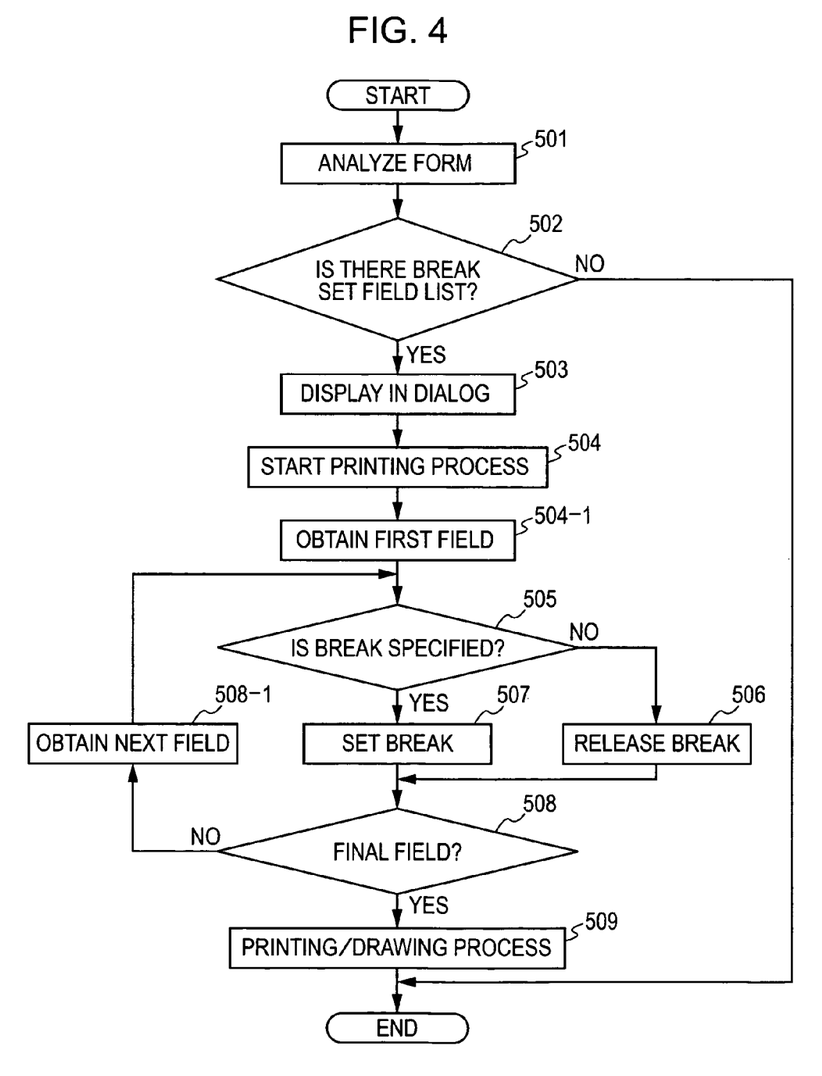
FIG. 4 shows a flowchart showing the flow of exemplary processing according to a first embodiment of the present invention.

FIG. 4 shows the flow of an exemplary printing process of the embodiment of the present invention. The user sets in advance "candidates" to be set to breaks in a form by a break setting process (not shown). The program 403 (form application program) stored in the HD 205 may be loaded into the RAM 202 and may be executed by the CPU 200. This applies the same for FIGS. 5, 7, and 8.

The process begins when a form reading instruction or a printing instruction is input from the user or from another program, the program 403 reads a form and analyzes it (step 501). The flow of form analysis is shown in FIG. 5 and is described below.

Figure 5:
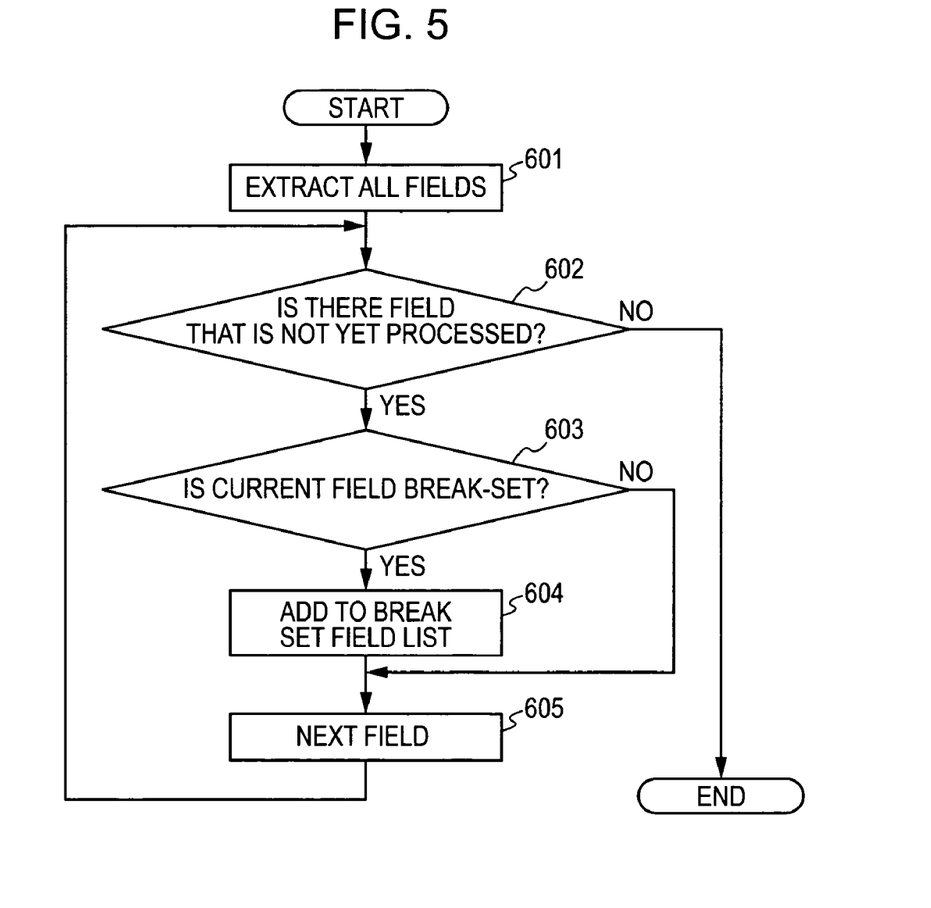
FIG. 5 shows a flowchart showing the flow of exemplary processing for analyzing forms.

Referring to FIG. 5, the program 403 extracts all the fields within the form and stores them in the RAM 202 (step 601). The program 403 sequentially checks the stored fields in order to determine whether or not a field exists (step 602). When a field exists in step 602, it is determined whether a break is set in that field (step 603). When it is determined in step 603 that a break is set, the program 403 adds the field to the break set field list (step 604). Then, the program moves to the next extracted field (step 604). When it is determined in step 602 that a break is not set, the form analysis process is completed and ends.

Referring back to FIG. 4, the program 403 determines whether or not there is a field that is added to the break set field list (step 502). When it is determined in step 502 that an added field exists, the field is displayed in the dialog window (step 503).

Figure 6:
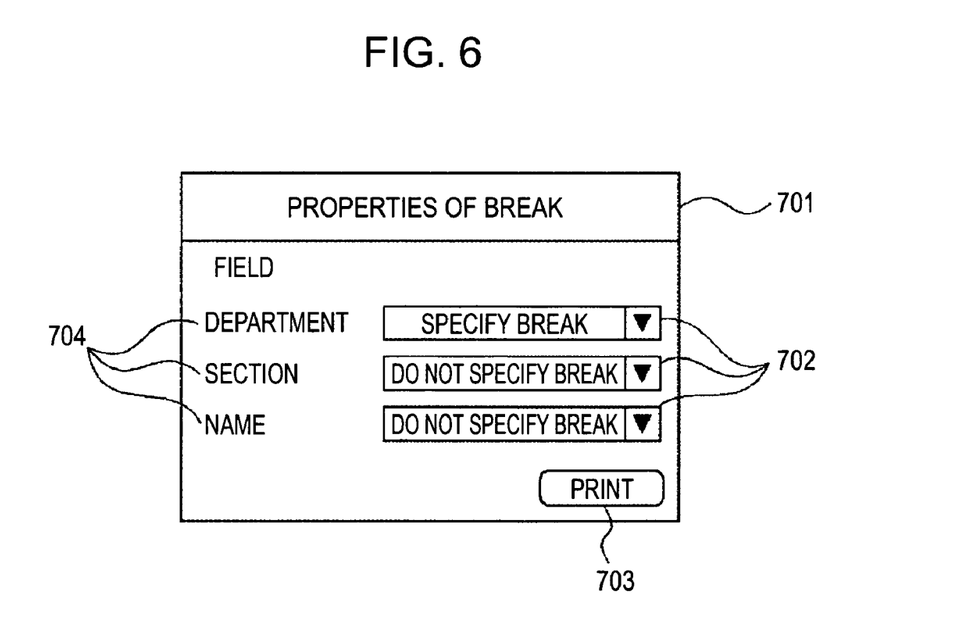
FIG. 6 shows an example of a property dialog window of a break.
Figure 9A:
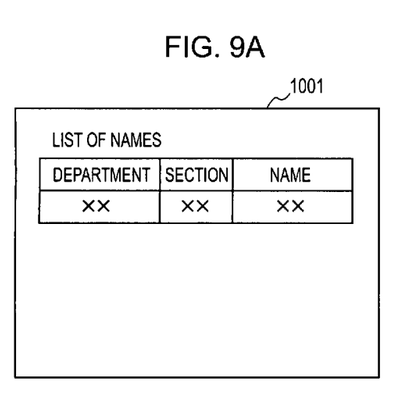
FIGS. 9A and 9B show examples of forms and data.

FIG. 6 shows an example of a property dialog window for a break when a form 1001 of FIG. 9A is read (when a break is set in each of the department, the section, and the name in advance in the form 1001). In a property dialog window 701, a field 704 added to the break set field list is displayed. Reference numeral 702 denotes a drop-down list capable of selecting "specify a break" or "do not specify a break", and a selection can be made in each of the displayed fields. In the break set field list, fields are stored in descending order of high break priority. In the property dialog window 701, the field 704 is displayed with the priority held.

In this embodiment, an example of a selection using a drop-down list is described. The example is not limited to this method, and a method capable of selecting another break specification may be used. After the above-described specification is selected, when a button 703 is depressed, the program 403 stores the above-described specification and starts a printing process (step 504). In step 504-1, the first stored field is obtained.

The program 403 next makes a determination as to the break specification (step 505). When the break specification has been performed, the program 403 sets a break in a field within the form (step 507). When the break specification has not been performed, the program 403 releases the break (step 506). The above-described steps are repeated for all the fields. Next, the program determines whether the final field has been reached (step 508). If it is determined by the program 403 that the final field has not been reached, the next field is obtained in step 508-1, and the process proceeds to step 505. When the final field has been reached (YES in step 508), a printing and drawing process is performed (step 509). The process then ends.

Figure 12:
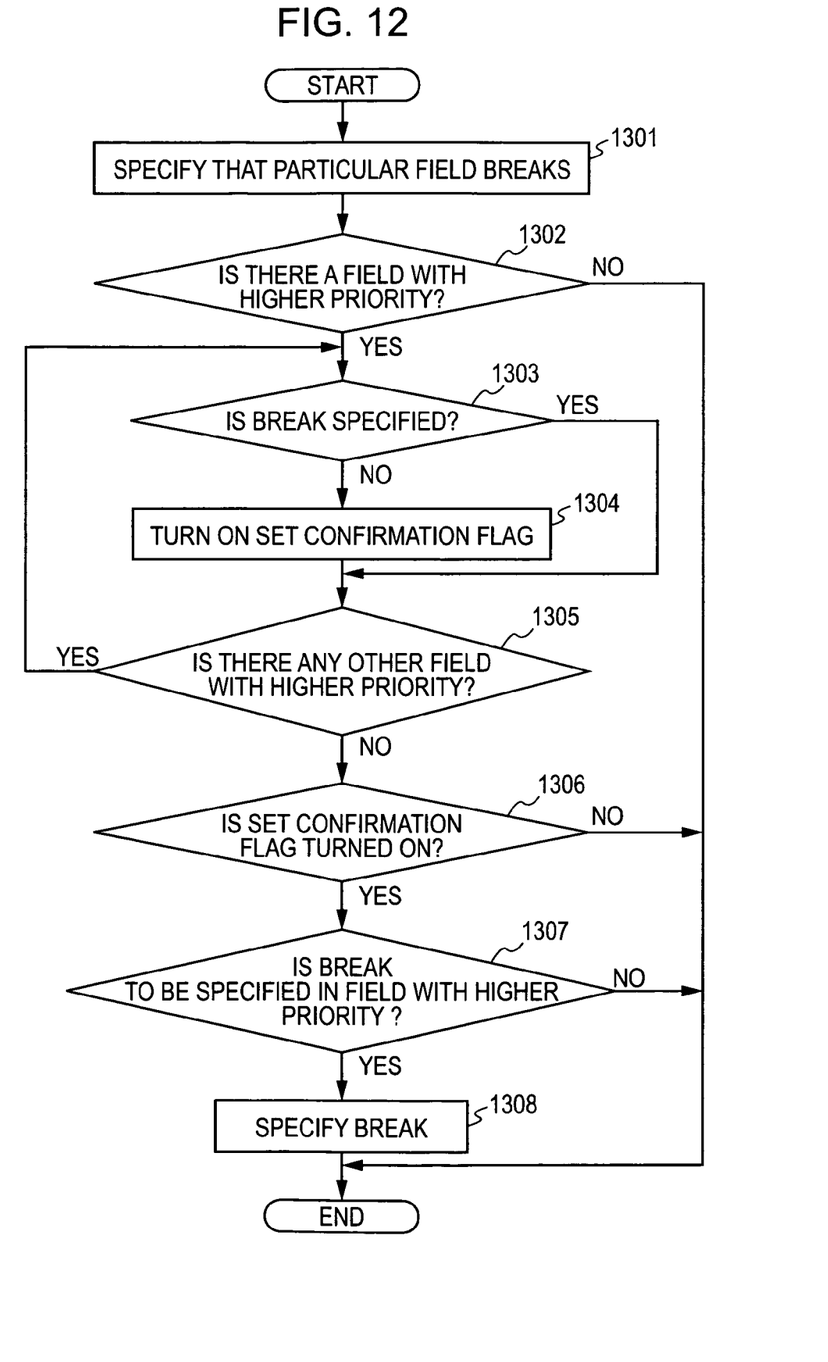
FIG. 12 shows an exemplary processing flow when it is specified that a field breaks in a property dialog window for a break.

FIG. 12 shows an exemplary processing flow when it is specified that a field breaks in the property dialog window 701. In the property dialog window 701 displayed in step 502, when the user specifies that a particular field breaks (step 1301), the program 403 determines whether or not there is a field with a priority higher than that of that field (step 1302). When there is a field with a higher priority in step 1302, the program 403 determines whether it is specified that the field with a higher priority breaks (step 1303). If there is not a field with higher priority (step 1302), the process ends.

When it is not specified that the field with a higher priority breaks in step 1303, the program 403 sets a flag for confirming a setting (step 1304) and holds the flag in the RAM 202. In step 1305, the program 403 determines whether there is another field with a higher priority. When it exists, the process returns to step 1303, and if not, the process proceeds to step 1306.

In step 1306, the program 403 determines whether the flag for confirming a setting, which is held in the RAM 202, is set. When it is determined that the flag is set, a setting confirmation screen (not shown) is displayed, and a confirmation is made to the user as to whether a break specification should be made to the field with a higher priority (step 1307). If the set confirmation flag is not turned on (step 1306), the process ends.

When the user selects on the setting confirmation screen (not shown) in step 1307 that a break occurs in the field with a higher priority, the program 403 changes the break specification of the field with a higher priority (step 1308). When the user selects that a break does not occur in the field with a higher priority (step 1307), the program 403 performs nothing, and the processing is completed.

Figure 13:
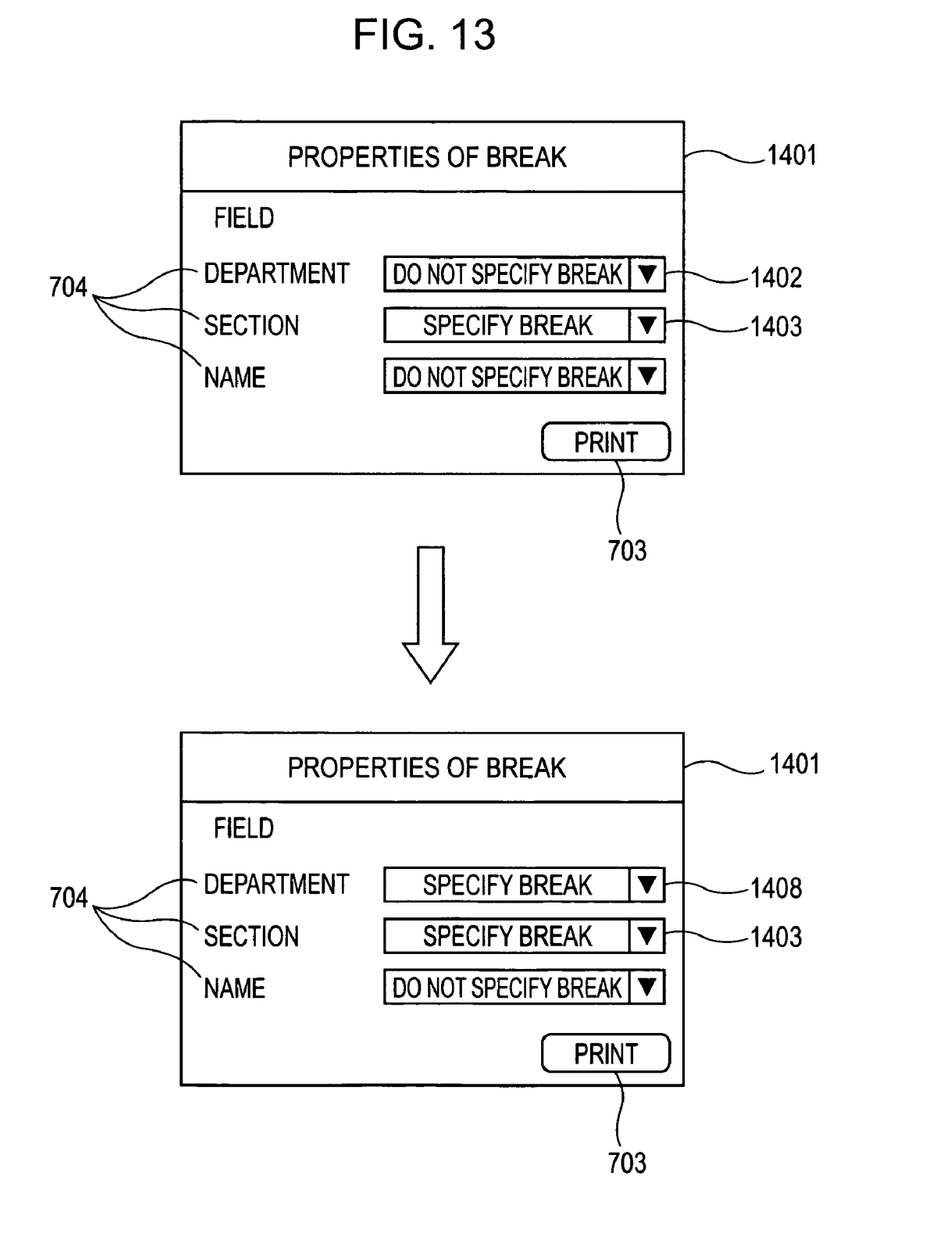
FIG. 13 shows an example of a property dialog window for changing the break specification of a field with a higher priority.

FIG. 13 shows another example of a property dialog window 1401 (similar to that shown in FIG. 6) by which the break specification of a field with a higher priority changes when break specification is made to a field with a lower priority. When it is specified in the drop-down list that a break occurs in "section" (see reference numeral 1403) and the user selects on the setting confirmation screen that a break occurs in a field with a higher priority, the program 403 changes the break of "department" of the property dialog window 1401 from "do not specify break" (see reference numeral 1402) to "specify break" (see reference numeral 1408). After the above specification, when the button 703 is depressed, processing identical to step 504 and subsequent steps are performed.

In this embodiment, an example of a selection using a drop-down list is described. The embodiment is not limited to this method, and another method capable of selecting break specification may also be used. Further, in this embodiment, an example is described in which a setting confirmation screen is displayed and the user selects "specify break" or "do not specify break" in a field with a higher priority. Alternatively, a break may be specified automatically for a field with a higher priority without displaying a setting confirmation screen, or a field with a higher priority may not be changed.

Figure 9B:
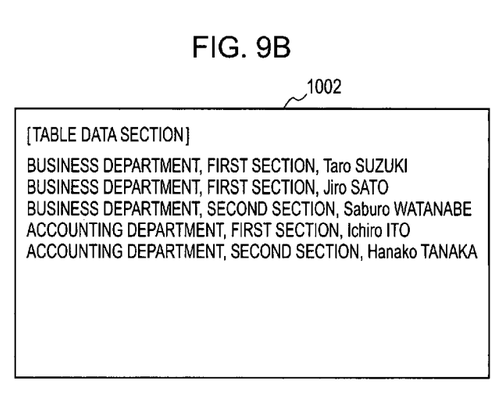
Figure 10A:
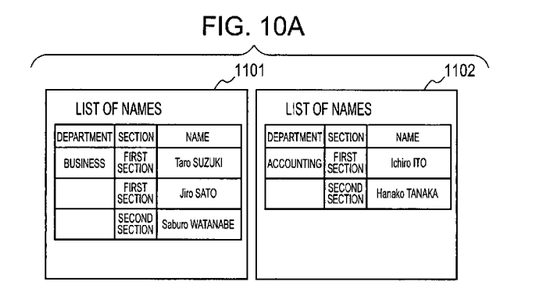
FIGS. 10A and 10B-show examples of output results when the present invention is used.
Figure 10B:
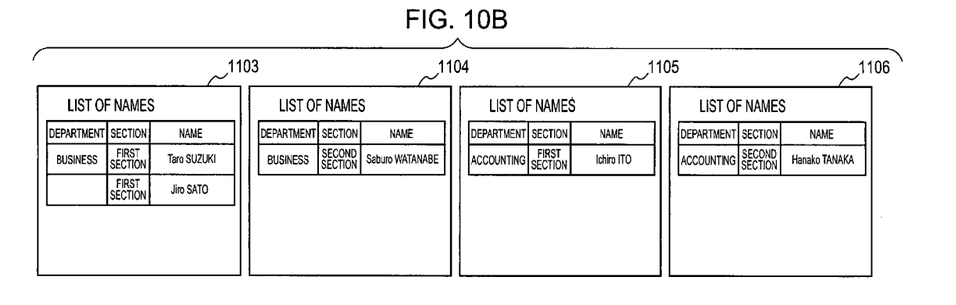

Examples of results in which the form 1001 of FIG. 9A and a data file 1002 of FIG. 9B are used and printed are shown in FIGS. 10A and 10B (it is assumed that a break is set in each of the department, the section, and the name in advance in the form 1001). The data file 1002 may be of any suitable format (e.g., CSV format), and data may be obtained from a database or the like.

FIG. 10A shows an example of a result in which a break is specified to "department", and a break is not specified to "section" or "name" in the property dialog window 701. 1101 is a page corresponding to a business department and 1102 is a page corresponding to an accounting department. FIG. 10B shows an example of a result in which a break is specified to "department" and "section", and a break is not specified to "name" in the property dialog window 701. 1103 is a page corresponding to a first section of the business department and 1104 is a page corresponding to a second section of the business department. 1105 is a page corresponding to a first section of an accounting department and 1106 is a page corresponding to a second section of the accounting department.

Second Exemplary Embodiment

Figure 7:
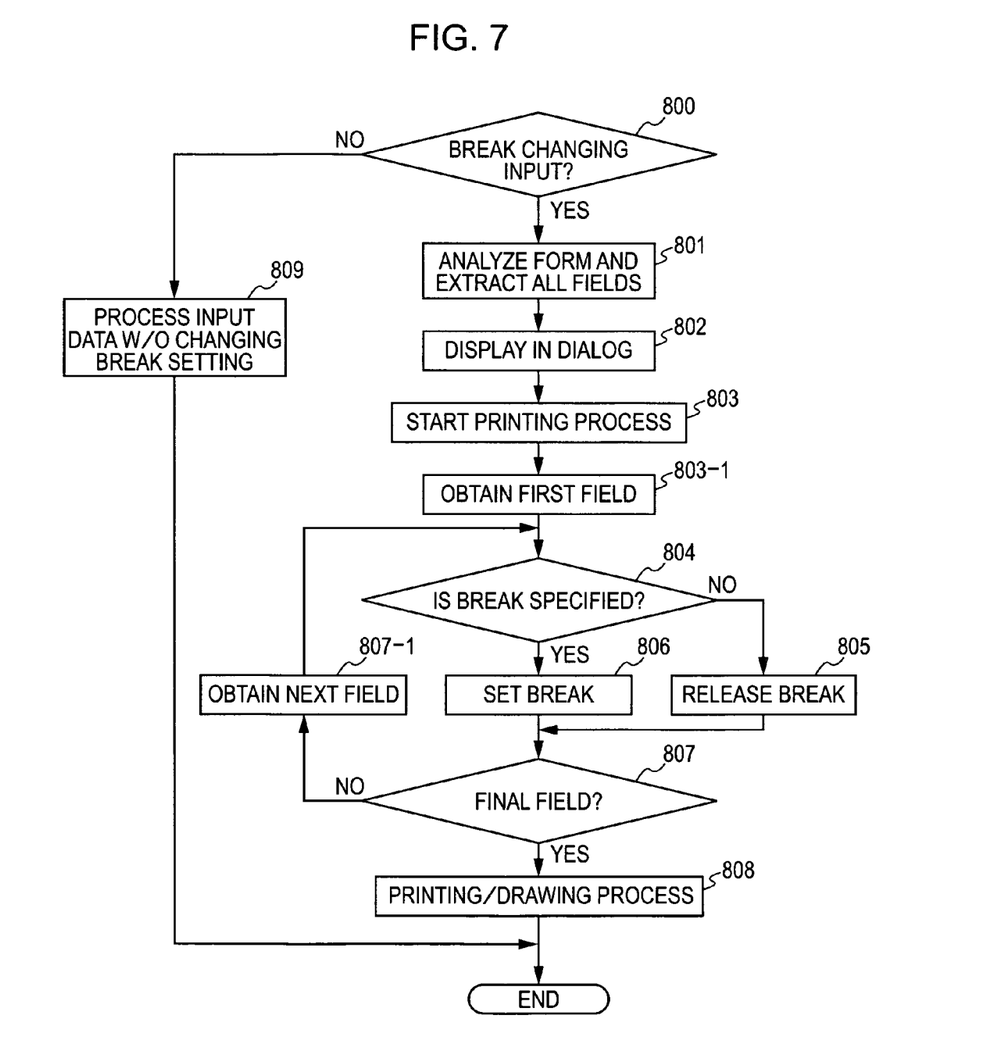
FIG. 7 shows an example of a flowchart showing the flow of exemplary processing according to the embodiment of the present invention.
Figure 14:
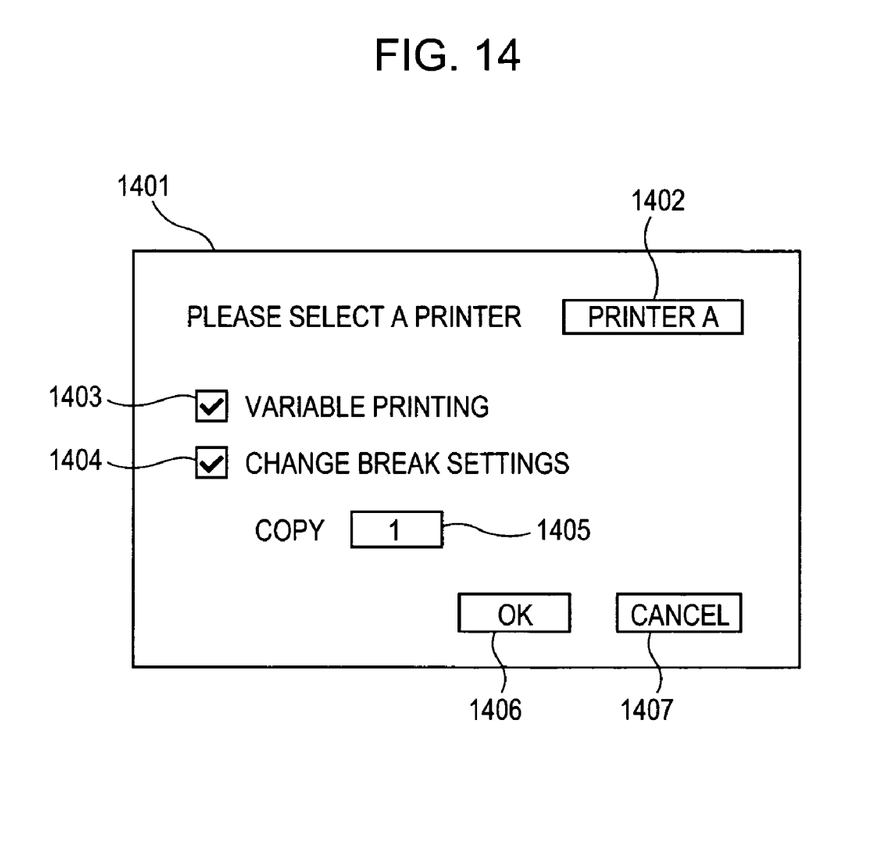
FIG. 14 shows an example of a setting dialog for program 403.

In the above-described embodiment, a break is set in advance in a form. Alternatively, a break can be specified at the time of printing without setting a break in advance. FIG. 7 shows the flow of this embodiment and FIG. 14 shows an example of a screen 1401 for selecting settings for program 403 in advance. Here, the screen 1401 may include a printer selection box 1402, a variable printing selection box 1403, a change break settings box 1404, a box 1405 to input the number of copies, a confirmation key 1406, and a cancel key 1407.

First, an operator inputs desired settings as shown in FIG. 14. In this example, when the break settings change box 1401 is selected, this enables the operator to instruct the program 403 to change a break setting previously set to form data or not.

The process shown in FIG. 7 starts when an operator instructs printing operation by pushing "OK" button 1401 (FIG. 14). At step 800, the program 403 determines whether a break changing instruction has been input by checking check box 1401. If the program 403 determines at step 800 that a breaking changing instruction has not been input (no at step 800), the program 403 processes input data for printing without changing break setting set into the data for printing (step 809). After step 809, the process ends.

If the program 403 determines at step 800 that a breaking changing instruction has been input (yes at step 800), the program 403 executes step 801. Here, the program 403 reads and analyzes a form, extracts all the fields within the form (step 801), and displays the dialog window 701 (step 802). In the dialog window 701, all the fields 704 are displayed. Reference numeral 702 denotes a drop-down list capable of selecting "specify a break" or "do not specify a break", and a selection can be made in each of all the displayed fields. In this embodiment, an example of a selection using a drop-down list is described. The example is not limited to this method, and a method capable of selecting another break specification may be used. After the above-described specification is selected, when the button 703 is depressed, the program 403 stores the above-described specification and starts a printing process (step 803). Step 803 and subsequent steps are identical to those of FIG. 4 in the first embodiment, and accordingly, descriptions thereof are omitted.

Figure 11A:
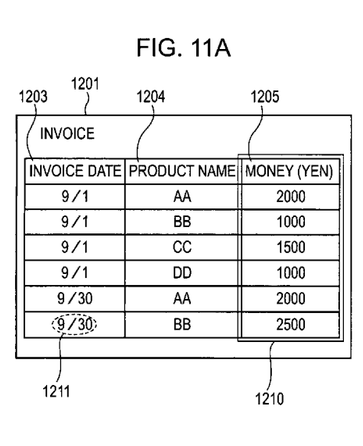
FIGS. 11A and 11B show examples of paper document forms.
Figure 11B:
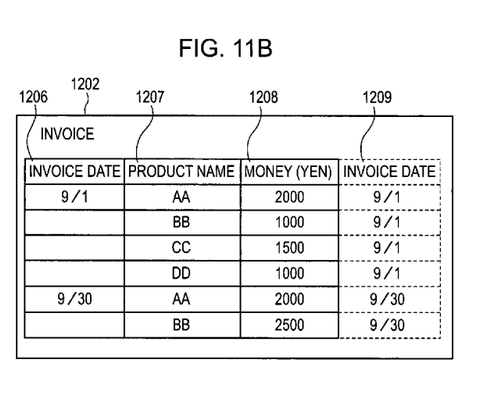

In this embodiment, a description is given of a method of making a determination as to a break when data created by applying OCR to a form of a paper document is to be printed. For example, when the same field value (in this example, "invoice date") continues in a paper document form shown in FIGS. 11A and 11B, there are two kinds: FIG. 11A in which a value is written in each row and FIG. 10B in which a null is written in the case of the same value.

For a paper document form 1201 of FIG. 11A, a break is specified at a place where the value of a field is changed, and this is similar to that in the first embodiment. For a paper document form 1202 of FIG. 11B, it is assumed that "when the field value is a null, this is made to be the same as the value of the previous row". That is, if a field value exists, the value is stored. If the field value is a null, a process for setting the stored value to the field value is performed. A hidden invoice date field may be provided with respect to the invoice date, and processing may be performed.

Figure 8:
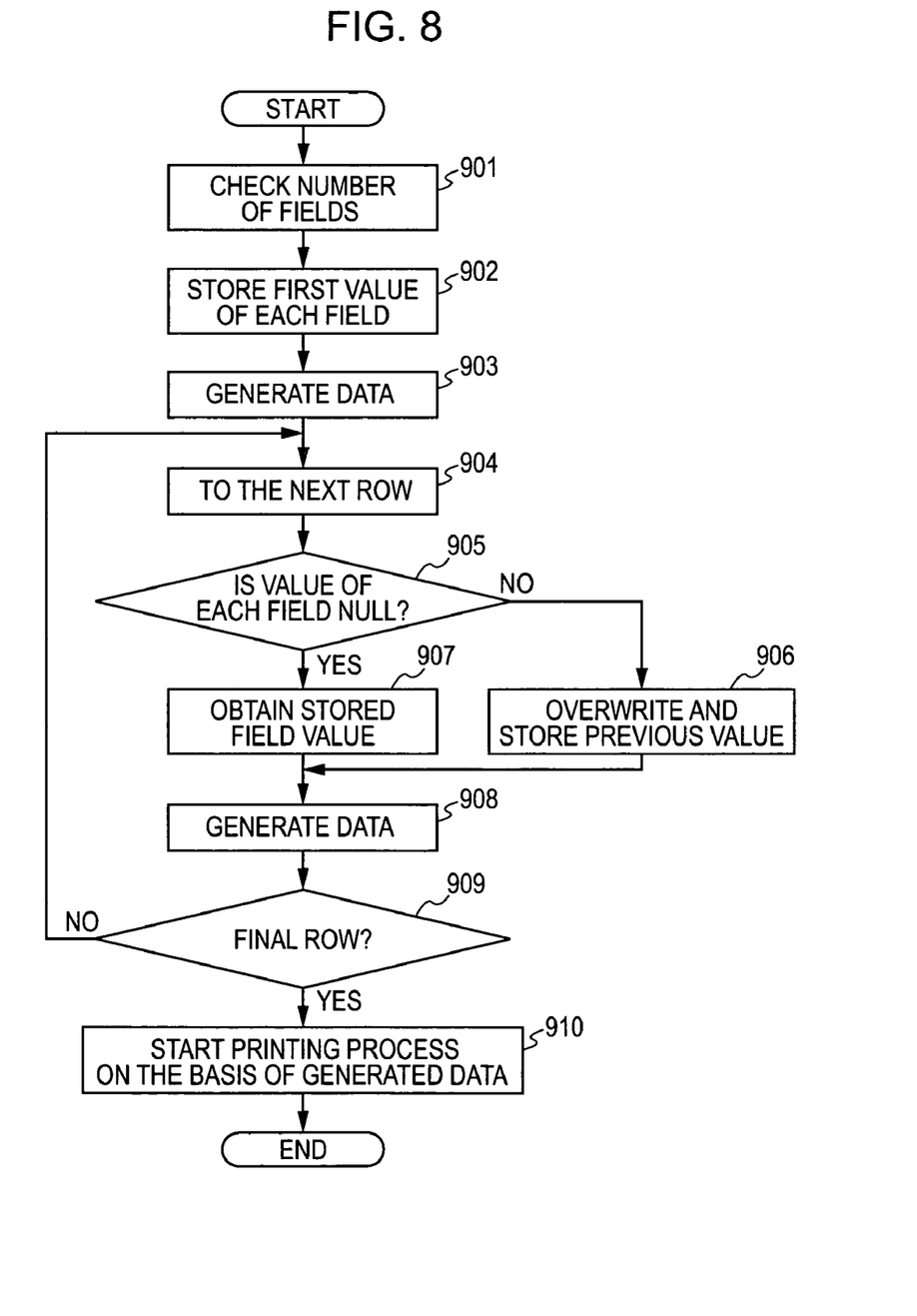
FIG. 8 shows a flowchart showing the flow of exemplary processing according to another embodiment of the present invention.

FIG. 8 shows the flow of an exemplary processing according to the aforementioned embodiment of the present invention. The program 403 analyzes the number of fields of the paper document form 1202 and stores it (step 901). Next, the first value of each field is obtained, and this is stored in a field area of the hidden invoice date of the RAM 202 (step 902), and the value is generated as data (step 903). The process proceeds to the next row (step 904) and a check is made to determine whether or not the value of each field is a null (step 905).

When it is determined in step 905 that the field is a null, the program 403 obtains the previously stored value of the field from the RAM 202 (step 907) in order to generate data, and this data is stored in the hidden invoice date field (step 908). When it is determined in step 905 that the field of the invoice date is not a null, the value is obtained. The obtained value is overwritten on the previously stored value in the hidden invoice date field, the value is stored in the RAM 202 (step 906), and data is generated (step 908).

It is then determined whether or not the final row is reached (step 909). If not, the process returns to step 904. When the processing up to the final field is completed, an example is added to the data of FIG. 11B, that is, a hidden invoice date field 1209 is added. A value equal to that of an invoice date field 1203 is written thereinto. The hidden invoice date field is used to determine the necessity of inserting a break. That is printed actually is an invoice date field 1206, and the hidden invoice date field 1202 is not printed on paper.

When the final row is reached, a printing process is started on the basis of the data generated in the above-described step (step 910). Step 910 is identical to the process (FIG. 4) described in the first embodiment or the process (FIG. 7) described in the second embodiment. The break setting for the invoice date field 1206 is ignored, and the break setting is determined on the basis of the hidden invoice date field 1202 formed in the above-described process. FIGS. 4 and 7 are used as processing examples. Here, the hidden invoice date field 1209 is processed in steps 504-1, 508-1, 803-1, and 807-1. It is further noted that in the above embodiment, the field is defined in column units (vertical), but may be defined in row (horizontal) units.

As has thus been described, in this embodiment, a method capable of processing form data containing a field 1207, which contains a plurality of record data, that is, each record data 1211 in the fields 1203 to 1209 in FIG. 11, is disclosed. In that method, the following are disclosed: a program 403 for analyzing a form and executing a process for specifying fields in which a break can be set in accordance with a printing instruction (step 503 in FIG. 4); a process for specifying fields in which break setting is instructed from the field specified by the program (step 505 in FIG. 4); and a process for inserting a break instruction at a place where a record data change occurs in the fields of record data specified by the break setting instruction (step 507 in FIG. 4).

The specified field is displayed in step 503 of FIG. 4 on the display screen 207. On the screen (FIG. 6) on which the displayed field is displayed, an instruction for selecting a specific field from among displayed fields is performed by the drop-down list 702, so that, in response to the depressing of the button 703, break setting is instructed in a field to be indicated.

An embodiment is also described in which, as a result of substitution with a field value having a null stored therein in step 907 of FIG. 8, when the specified field contains a null, for the record containing a null as data, null data is assumed to be the same data as the data contained in an immediately previous non-null record, and a break key is inserted.

Other Exemplary Embodiments

Processing shown in FIGS. 5, 4, 7, and 8 in this embodiment is performed by each apparatus in accordance with a program that may be externally installed. In that case, the present invention can be applied to even a case in which an information group containing programs is supplied to a computer from a storage medium such as a CD-ROM, a flash memory, and an FD, or from an external storage medium via a network.

The present invention can be achieved by supplying a storage medium storing software program code that achieves the functions of the above-described embodiments to a system or an apparatus. That is, the present invention can be achieved by enabling a computer (or a central processing unit (CPU) or a micro-processing unit (MPU)) of the system or apparatus to read the program code stored in the storage medium and to execute the program code.

In this case, the program code itself read out of the storage medium realizes the functions of the above-described embodiments and the storage medium storing the program code can realize the present invention. Examples of storage media supplying program code include a floppy disk, a hard disk, an optical disk, a magneto-optical disk, a DVD, a CD-ROM, a magnetic tape, a non-volatile memory card, a ROM, and an EEPROM.

Also, in addition to the functions of the above-described embodiments being realized by the program read out being executed on a computer, the functions of the above-described embodiments may be realized by the operating system running on the computer performing part or all of the actual processing based on instructions of the program. Moreover, the functions described above may be realized by the program read out from the storage medium being written to memory provided to a function expansion board inserted to the computer or a function expansion unit connected to the computer and thereafter, the OS running on the computer performs part or all of the actual processing based on instructions of the program.

As many apparently widely different embodiments of the present invention can be made without departing from the sprit and scope thereof, it is to be understood that the invention is not limited to the specific embodiments thereof except as defined in the claims.

This application claims the benefit of Japanese Application No. 2004-366004 filed Dec. 17, 2004, and No. 2005-349489 filed Dec. 2, 2005, which are hereby incorporated by reference herein in their entirety.

What is claimed is:

1. An information processing method performed in an information processing apparatus for processing printing form data in which a plurality of fields are defined, the fields including record data, the method comprising:

inputting a printing instruction;
analyzing form data to determine if there are breaks which are set in the form data according to break set field list; and
displaying, a dialog for portion for instructing printing on a screen the selecting field added to the break set field list, wherein the break set field list are stored in descending order of high break priority; and the field is displayed with the priority help;
obtaining first field to determine if a break is specified;
setting is set when print and break changing instructions are input;
indicating, via a change indication unit, a field for which the break setting is changed among the field specified by the specifying unit via the screen displayed by the display unit; and
inserting, via an inserting unit, a break instruction at a position where a data break occurs in the field for which the break setting is changed.

2. The information processing method according to claim 1, further comprising displaying each specified field on a display screen.

3. The information processing method according to claim 2, wherein on the display screen, a field for which a break setting is to be set, is set in response to an input of an instruction for selecting a specific field from among displayed fields.

4. The information processing method according to claim 1, wherein when there is a field that contains a null among the specified fields, for a record data containing a null, null data is assumed as the same data as non-null record data, and a break key is inserted.

5. The information processing method according to claim 1, further comprising displaying a dialog which inquires whether the operator inputs the change instruction or not.

6. An information processing apparatus configured to print form data in which fields are defined and contain record data, the apparatus comprising:
inputting a printing instruction;
an analyzing unit configure to analyze form data to determine if there are breaks which are set in the form data according to break set field list; and
displaying, via a displaying unit, a dialog for portion for instructing printing on a screen the selecting field added to the break set field list, wherein the break set field list are stored in descending order of high break priority; and the field is displayed with the priority help;
a specifying unit configured to obtain first field to determine if a break is specified, in which at least one break is set when print and break changing instructions are input;
a change indication unit configured to indicate a field for which the break setting is changed among the fields specified by the specifying unit via the screen displayed by the display unit; and
an inserting unit configured to insert a break instruction at a position where a data break occurs in the field for which the break setting is changed.

7. The information processing apparatus according to claim 6, further comprising a display unit configured to display the specified field by the specifying unit on a display screen.

8. The information processing apparatus according to claim 6, wherein when there is a field that contains a null among the fields specified by the specifying unit, for a record data containing null data, null data is assumed as a non-null record, and a break key is inserted.

9. The information processing apparatus according to claim 6, further comprising a displaying unit configured to display a dialog which inquires whether the operator inputs the change instruction or not.

10. A computer readable medium having computer-executable instructions that, when executed on one or more processors, cause the one or more processors to execute computer executable instructions for printing form data in which fields are defined and contain record data, the medium comprising:
computer-executable instructions for inputting a printing instruction;
computer-executable instructions for analyzing unit configure to analyze form data to determine if there are breaks which are set in the form data according to break set field list; and
computer-executable instructions for displaying, a dialog for portion for instructing printing on a screen the selecting field added to the break set field list, wherein the break set field list are stored in descending order of high break priority; and the field is displayed with the priority help;
computer-executable instructions configured to obtain first field to determine if a break is specified, in which at least one break is set when print and break changing instructions are input;
computer-executable instructions for changing indication configured to indicate a field for which the break setting is changed among the fields specified by the specifying unit via the screen displayed by the display unit; and
computer-executable instructions for inserting a break instruction at a position where a data break occurs in the field for which the break setting is changed.

* * * * *